Jan. 17, 1967   R. H. FRICK ET AL   3,298,626

EXPANSIBLE MANDREL

Filed July 12, 1965

United States Patent Office 3,298,626
Patented Jan. 17, 1967

3,298,626
EXPANSIBLE MANDREL
Richard H. Frick and Herbert H. Scholz, both of Neenah, Wis., assignors to Kimberly-Clark Corporation, Neenah, Wis., a corporation of Delaware
Filed July 12, 1965, Ser. No. 471,291
4 Claims. (Cl. 242—72)

This invention relates to expansible mandrels or coreshafts, particularly for holding and supporting rolls of paper in papermaking or paper converting machines.

It is an object of the present invention to provide an improved construction for a mandrel of this type which is expansible under the application of fluid pressure; and, more particularly, it is an object to provide such a construction comprising an internal boot of rubber-like material which seals with respect to an internal coreshaft, due to the construction of the boot and coreshaft, under the action of fluid under pressure supplied to a cavity within the boot.

In a preferred form of the invention, a coreshaft is provided with a series of grooves formed in its external surface which are overlaid by the boot so that when fluid under pressure is applied within the boot, the boot expands inwardly and enters these grooves to make a good fluid type seal with the coreshaft.

Figure 1:
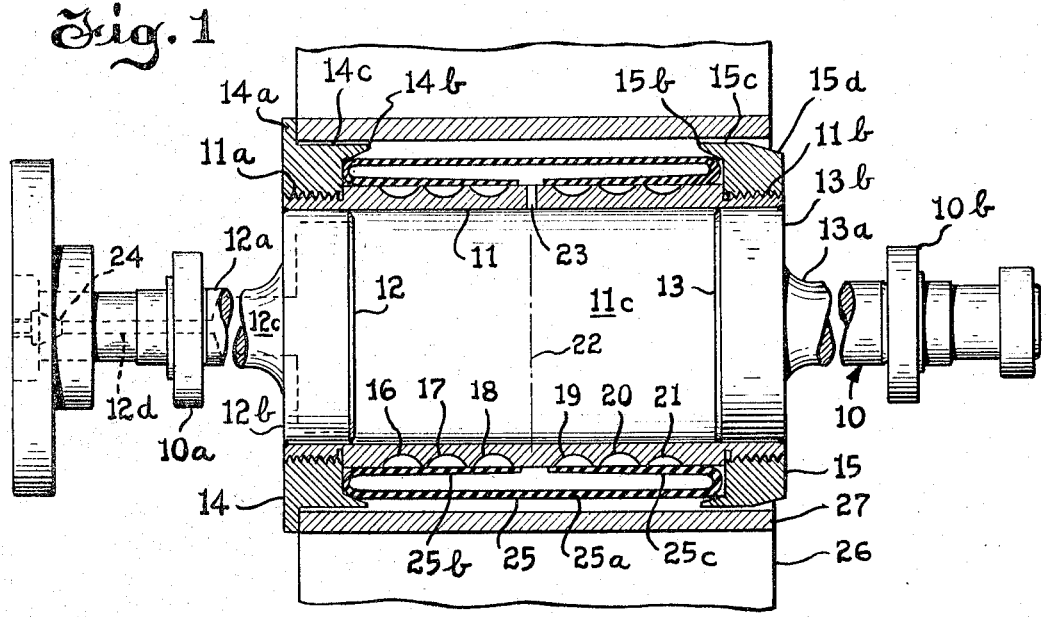
Figure 2:
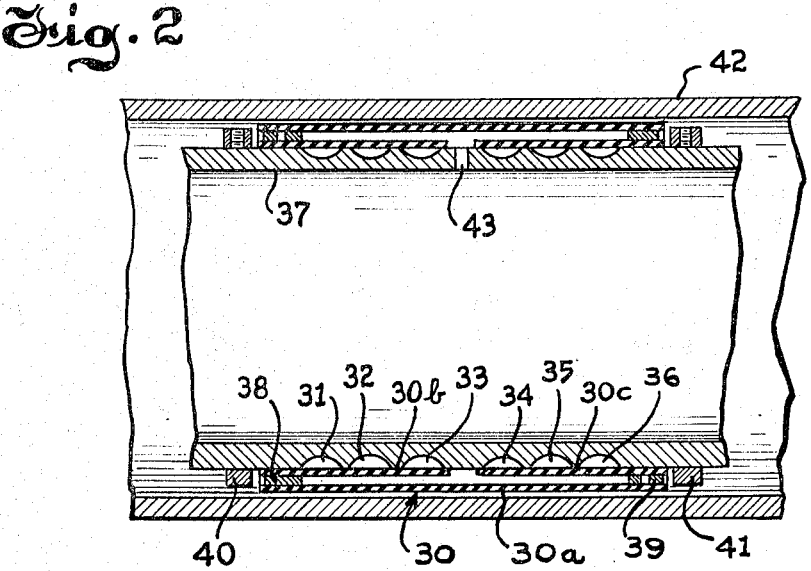

The invention consists of the novel constructions, arrangements and devices to be hereinafter described and claimed for carrying out the above stated objects, and such other objects, as will be apparent from the following description of preferred forms of the invention, illustrated with reference to the accompanying drawings, wherein:

FIG. 1 is a longitudinal sectional view of a coreshaft assembly having a paper roll disposed on it and embodying the principles of the invention; and FIG. 2 is a longitudinal sectional view of a coreshaft assembly constituting a modification of the invention.

The coreshaft assembly illustrated in FIG. 1 comprises a core or coreshaft 10 which is adapted to be rotatably mounted in suitable standards or arbors (not shown). The coreshaft 10 comprises a central, hollow, cylindrical part 11 and an end part 12 having an end shaft portion 12a and an enlarged cylindrical portion 12b which is fixed in one end of the cylindrical part 11 as illustrated. An end part 13 having portions 13a and 13b and corresponding to the part 12 is fixed in the other end of the cylindrical part 11. The mounting of the coreshaft 10 may be by means of bearings 10a and 10b on the shaft portions 12a and 13a.

The cylindrical part 11 is provided with screw threaded end portions 11a and 11b, and a stop ring 14 is screwed onto the screw threaded portion 11a. The stop ring 14 is provided with an external annular flange 14a, an axially extending flange portion 14b and an external cylindrical surface portion 14c provided partially by the flange portion 14b and terminated by the annular flange 14a.

A guide ring 15 is in screw threaded engagement with the threaded portion 11b on the other end of the cylindrical part 11. The guide ring 15 comprises an axially extending flange portion 15b corresponding to the flange portion 14b and a cylindrical surface portion 15c corresponding to the surface portion 14c and of the same diameter, the surface portion 15c being, however, foreshortened by means of a tapering surface portion 15d on the ring 15.

The part 11 is formed with a series of three circumferential grooves 16, 17 and 18 and a series of three similar grooves 19, 20 and 21, all provided in the outer cylindrical surface of the part 11. The grooves 16, 17 and 18 are located on one side of the center line 22 of the part 11, and the grooves 19, 20 and 21 are located on the other side of the center line 22. The grooves 16 to 21 may, for example, be about 3/16 inch in depth and have a radius of about 3/8 inch, and the cylindrical part 11 may, for example, have an external diameter of about 5½ inches.

An opening 23 is provided through the part 11 on the center line 22 which is in communication with the internal cavity 11c of the part 11. The part 12 is provided with an internal cavity 12c in communication with the cavity 11c and is provided also with a central bore 12d extending to the end of the shaft portion 12a. An auto-tire type air valve 24 is threaded into the end of the bore 12d, so that air under pressure may be supplied through the bore 12d into the cavities 12c and 11c and thereby through the opening 23, as will be hereinafter more fully described.

A pneumatic boot 25 of tubular rubber-like material is disposed on the external surface of the part 11 between the rings 14 and 15. The boot 25 has a relatively thick central portion 25a and two flange portions 25b and 25c which underlie the portion 25a and are of gradually decreasing thickness toward their ends. The portion 25b overlies the grooves 16, 17 and 18, and the portion 25c overlies the grooves 19, 20 and 21. The ends of the flange portions 25b and 25c are spaced from each other so as to uncover the opening 23, and the boot 25 underlies both of the flange portions 14b and 15b, as illustrated. A roll 26 of paper having a pasteboard core 27 is illustrated as being positioned on the coreshaft assembly and particularly around the cylindrical surface portions 14c and 15c.

The paper roll 26 may be positioned on the coreshaft assembly simply by moving it over the shaft portion 13a and sliding it over the cylindrical ring portions 14c and 15c. The tapered portion 15d acts to position the paper roll, and the flange 14a limits the movement that the paper roll may have to the left as seen in FIG. 1. The paper roll 26 may be fixed on the coreshaft 10 by applying air under pressure into the boot 25 through the valve 24, the bore 12d, the cavities 12c and 11c and the opening 23. The air under pressure causes the boot 25 to expand radially and to grip the internal surface of the pasteboard core 27, as well as to center the roll 26 and the core 27 with respect to the coreshaft assembly 10, so that the axis of the roll 26 coincides with the axis of the coreshaft 10. The air pressure also causes the flange portions 25b and 25c to expand inwardly and also longitudinally so that the flange portions 25b and 25c extend into the grooves 16 to 21 and grip the surfaces of these grooves, as well as the outer cylindrical portions of the part 11 separating these grooves. This action of the boot flange portions 25b and 25c in extending into these grooves seals the flange portions with respect to the part 11 so as to prevent the escape of air from out of the boot. The boot thus grips the pasteboard core 27 and centers the core 27, together with the roll 26, with respect to the coreshaft 10 and holds the paper roll 26 fixed on the coreshaft 10.

The rings 14 and 15 hold the boot 25 from longitudinal expansion overall so that the boot flange portions 25b and 25c continue to overlie the grooves 16 to 21 and do not move laterally off these grooves when air under pressure is applied to the boot. The longitudinally extending flanges 14b and 15b hold the ends of the boot 25, which the flanges 14b and 15b overlie, down against the outer cylindrical surface of the part 11 so that there is no tendency for the boot to separate from this outer cylindrical surface at these places and so as to assure a good sealing of the boot flange portions 25b and 25c with respect to the part 11.

The inner flange portions 25b and 25c of the boot 25 in expanding lengthwise and inwardly and entering the grooves 16 to 21 provide an airtight seal when sufficient air pressure is applied within the boot to provide a good grip between the boot 25 and the paperboard core 27. Although, with one installation, a pressure of 5 to 10 pounds per square inch did not provide a good air seal between the boot flange portions 25b and 25c and the outer surface of the part 11 since the flange portions did not substantially enter the grooves 16 to 21, a substantially higher pressure of 30 to 40 pounds per square inch did provide such an airtight seal as well as a good grip of the pasteboard core 27; inasmuch as, with such higher pressures, the boot flange portions 25b and 25c expanded sufficiently to enter the grooves 16 to 21 and grip the surfaces of the grooves. In view of the fact that there is no glue or other adhesive necessary in order to fix the boot flange portions 25b and 25c with respect to the part 11, no re-glueing or cleaning of old glue from the surface of the part 11 is required when it is necessary to change the boot 25. In order to make a boot change, it is only necessary to unscrew the ring 15 from the part 11, slide off the old boot from the part 11 and slide on a replacement boot. The boot 25 is very effective for the purpose of fixing a relatively large paper roll with respect to the coreshaft assembly 10—in actual practice, it has been found that a paper roll of 60 inches diameter is fixed with respect to the coreshaft 10.

The assembly disclosed in FIG. 2 utilizes a boot 30 which is somewhat different in construction from the boot 25. The boot 30 has a central outer portion 30a and inner flange portions 30b and 30c overlying grooves 31, 32, 33, 34, 35 and 36 which are provided in a cylindrical part 37. The part 37 corresponds with the part 11 in the first form of the invention and may be rotatably mounted in the same manner as the part 11. The boot 30 has rigid metal rings 38 and 39 vulcanized into the boot 30 at the outer ends of the boot flange portions 30b and 30c, and positioning rings 40 and 41 are fixed on the part 37 at the two ends of the boot 30. A paperboard core 42 of a paper roll to be gripped by the boot 30 is illustrated as disposed over the parts 30, 37, 40 and 41, and an opening 43 is provided in the part 37 between the flange portions 30b and 30c to admit air under pressure into the boot 30.

The boot 30 functions to grip the paperboard core 42 and fix it with respect to the cylindrical part 37 as does the boot 25 in fixing the paperboard core 27 with respect to the cylindrical part 11 in the first embodiment. The boot flange portions 30b and 30c expand longitudinally and inwardly and enter into the grooves 31 to 36 in order to form an airtight seal in substantially the same manner as the flange portions 25b and 25c cooperate with the grooves 16 to 21 in the first embodiment. The rings 38 and 39 function to hold the outer ends of the boot flange portions 30b and 30c in contact with the outer cylindrical surface of the part 37 and in function and operation correspond with the longitudinally extending flange portions 14b and 15b in the first form of the invention. The end rings 40 and 41 function mainly to hold the boot 30 in position with respect to grooves 31 to 36 and with respect to the air inlet opening 43 in the part 37.

The second form of the invention illustrated in FIG. 2 has substantially the same advantages as the first form, differing mainly from the first form in having the rigid rings 38 and 39 in place of the overlying flange portions 14b and 15b, for holding the ends of the boot in contact with the inner core of the assembly.

We wish it to be understood that the invention is not to be limited to the specific constructions, arrangements and devices shown and described, except only insofar as the claims may be so limited, as it will be understood to those skilled in the art that changes may be made without departing from the principles of the invention.

What is claimed is:

1. An expansible mandrel comprising a core having an outer surface which is cylindrical except for a series of circumferential grooves provided in said surface, a boot of tubular rubber-like material having a central portion and two flange portions which are doubled under and within said central portion from opposite ends of said central portion and each of which overlies at least one of said grooves, and means for supplying fluid under pressure into said boot so as to expand said boot radially outwardly whereby to grip a hollow core of a workpiece which latter core is disposed about the boot and to expand the boot inwardly so that said flange portions enter into said grooves and thereby provide fluid tight seals with respect to said first named core.

2. An expansible mandrel comprising a core having an outer surface which is cylindrical except for a series of circumferential grooves provided in said surface, a boot of tubular rubber-like material having a central portion and two flange portions which are doubled under and within said central portion from opposite ends of said central portion so that their ends approach each other and have a gap between them and each of said flange portions overlying at least one of said grooves, a pair of retaining rings fixed on said core at the opposite ends of said central portion for positioning the boot on said core, and means for supplying fluid under pressure between the ends of said flange portions and including an opening provided through said core terminating between said flange portions so as to expand said boot radially outwardly to grip a cylindrical core of a workpiece which latter core is disposed about the boot and to expand the boot inwardly so that said flange portions enter into said grooves and thereby provide fluid tight seals with respect to said first named core.

3. An expansible mandrel comprising a core having an outer surface which is cylindrical except for a series of circumferential grooves provided in said surface, a tubular boot of rubber-like material having a central portion and two flange portions which are doubled under and within said central portion from opposite ends of said central portion and which gradually decrease in thickness toward their inner ends, the inner ends of said flange portions approaching each other and being spaced from each other and each of said flange portions overlying a plurality of said grooves, a pair of rings fixed on said core at said opposite ends of said central portion for positioning said boot and having flange portions overlying said ends of said central boot portion, and means for supplying fluid under pressure between the ends of said flange portions of said boot and including an opening provided through said core terminating between said boot flange portions so as to expand said boot radially outwardly to grip a cylindrical core of a workpiece which latter core is disposed about the boot and to expand the boot inwardly so that said flange portions of said boot enter into said grooves and thereby provide fluid tight seals with respect to said first named core.

4. An expansible mandrel comprising a core having an outer surface which is cylindrical except for a series of circumferential grooves provided in said surface, a boot of tubular rubber-like material having a central portion and two flange portions which are doubled under and within said central portion from opposite ends of said central portion and each of which overlies at least one of said grooves, a ring of relatively rigid material formed within said boot at each of the opposite ends of said central portion for maintaining the outer ends of said flange portions in contact with said core, a pair of rings fixed on said core at the opposite ends of said central portion for positioning the boot on said core, and means for supplying fluid under pressure between said flange portions and through said core so as to expand said boot radially outwardly whereby to grip a cylindrical core of a workpiece which latter core is disposed about the boot and to expand the boot inwardly so that the boot enters into said grooves and thereby provides fluid tight seals with respect to said first named core.

References Cited by the Examiner

UNITED STATES PATENTS

| | | | |
|---|---|---|---|
| 2,621,867 | 12/1952 | Grettve | 242—72 |
| 3,096,949 | 7/1963 | Huffman | 242—72 |
| 3,223,341 | 12/1965 | Gadde | 242—72 |

FRANK J. COHEN, *Primary Examiner.*

N. L. MINTZ, *Examiner.*